Figure 1A:
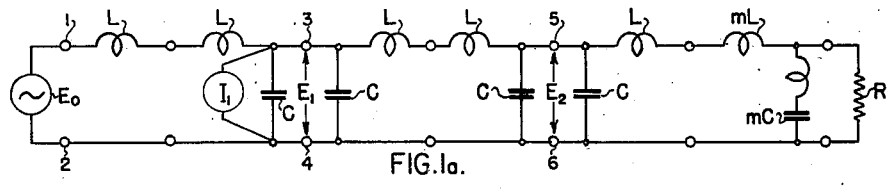

July 1, 1941.  H. A. WHEELER  2,247,538
DEAD-END FILTER CIRCUIT
Filed Jan. 11, 1940  3 Sheets-Sheet 1

INVENTOR
HAROLD A. WHEELER
BY
ATTORNEY

July 1, 1941.  H. A. WHEELER  2,247,538

DEAD-END FILTER CIRCUIT

Filed Jan. 11, 1940  3 Sheets-Sheet 2

INVENTOR
HAROLD A. WHEELER
BY Laurence B. Dodds
ATTORNEY

July 1, 1941.    H. A. WHEELER    2,247,538
DEAD-END FILTER CIRCUIT
Filed Jan. 11, 1940    3 Sheets-Sheet 3
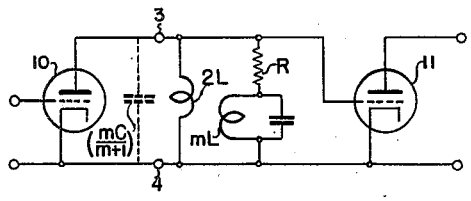
FIG. 9.
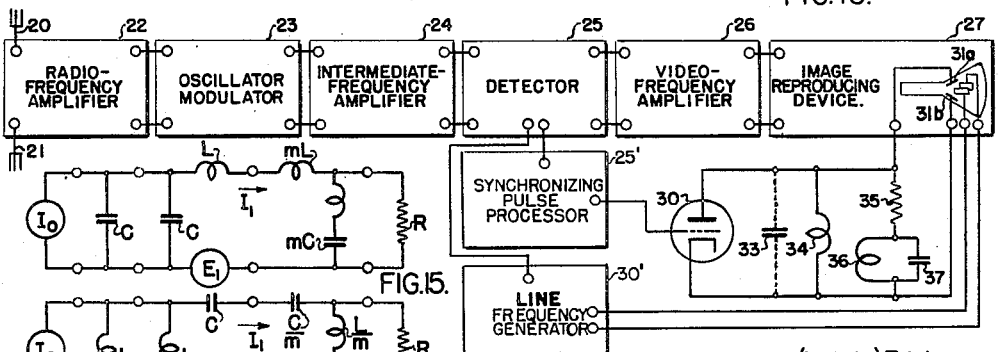
FIG. 13.
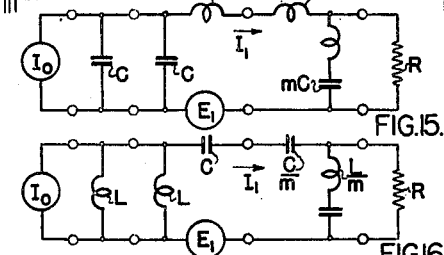
FIG. 15.
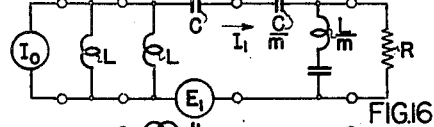
FIG. 16
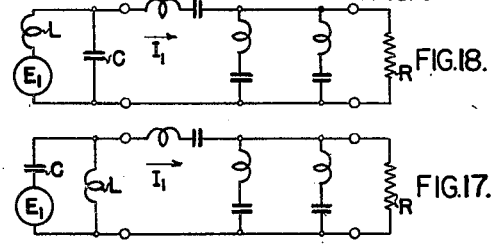
FIG. 18.
FIG. 17.
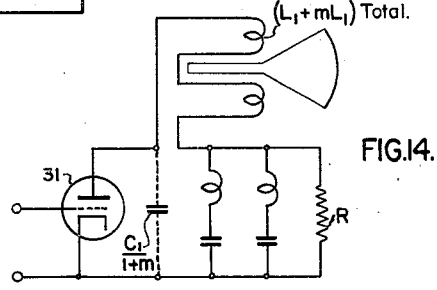
FIG. 14.
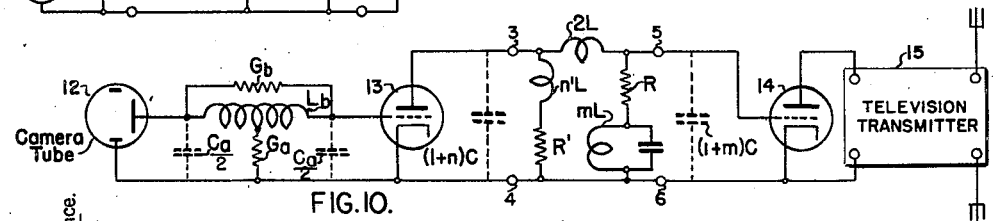
FIG. 10.
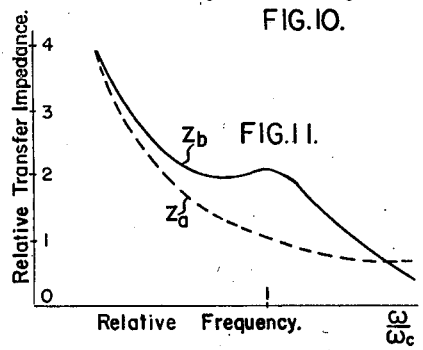
FIG. 11.
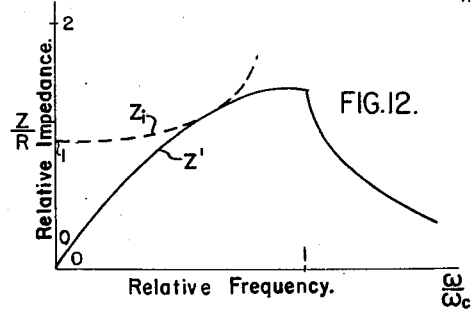
FIG. 12.
INVENTOR
HAROLD A. WHEELER
BY Lawrence B. Dodds
ATTORNEY Patented July 1, 1941

2,247,538

UNITED STATES PATENT OFFICE 2,247,538

DEAD-END FILTER CIRCUIT

Harold A. Wheeler, Great Neck, N. Y., assignor to Hazeltine Corporation, a corporation of Delaware Application January 11, 1940, Serial No. 313,360

17 Claims. (Cl. 178—44)

This invention relates to dead-end filter circuits of the type having a full-series or full-shunt arm at the end remote from the dead end and connected as a differentiating or integrating network, that is, to provide a response directly or inversely proportional to the frequency over the pass band. While the network of the invention is of general utility, it is particularly useful in the synchronizing-signal channel of television receivers where it may, for instance, be used to separate synchronizing pulses of short and long duration or to derive a voltage or current of sawtooth wave form from a signal of pulse wave form.

It is well known that the voltage developed across an inductance involves a differentiation of the current through the inductance and that the voltage developed across a condenser involves an integration of the current through the condenser. These known properties of these elements have been utilized for various purposes in the synchronizing-signal and scanning portions of television apparatus. For example, the current-integrating properties of a condenser have been utilized to derive a periodic voltage of sawtooth wave form from a periodic current of rectangular-pulse wave form. However, the range of frequencies necessary to represent a current of rectangular-pulse wave form is very large and, due to the fact that additional factors such as capacitance or inductance are necessarily present in a practical circuit, the integration or differentiation process may not be as exact as desired over a wide frequency range. It is, therefore, particularly desirable to provide a network for the same general purpose which will tolerate the other impedance factors of a practical circuit. It is also desirable to provide such a network which passes the wide frequency range involved in television synchronizing pulses.

It is an object of the invention, therefore, to provide an improved integrating wide band filter network which is free of one or more of the above-mentioned disadvantages of the simple integrating circuits of the prior art.

It is another object of the invention to provide an improved differentiating wide band filter network which is free of one or more of the above-mentioned disadvantages of the simple differentiating circuits of the prior art.

It is a specific object of the invention to provide an integrating network of the type under discussion which will tolerate the appreciable inherent undesired reactances involved in a practical circuit.

It is another specific object of the invention to provide a differentiating network of the general type under discussion which will tolerate the appreciable inherent undesired reactances of a practical circuit.

In accordance with the invention, a coupling network comprises a dead-end filter including an arm of series type and an arm of shunt type adjacent each other and remote from the dead end. One of the arms is coupled in the circuit of the filter in the manner which is normal for arms of its type while the other of the arms is an arm of a full filter section comprising a reactive element coupled in the circuit of the filter in the same manner as the one arm. Input and output circuits are so coupled with the filter that the transfer characteristic of the filter between the circuits varies substantially as a first power of the frequency, that is, either directly or inversely in accordance with the frequency, over the pass band of the filter.

As used in this specification, the term "transfer characteristic" is intended to include the parameters "transfer ratio," "transfer impedance" and "transfer admittance." The transfer ratio is the ratio of output current to input current or output voltage to input voltage. The transfer impedance between a pair of terminal circuits is defined as the ratio of the voltage output to the current input. The transfer admittance is defined as the ratio of the output current to the input voltage. While the term transfer impedance has been defined specifically with reference to a system involving separate input and output circuits, it will be understood that, in one limiting case, the input and output circuits may be one and the same and in such case the transfer impedance is the same as the self-impedance across the terminals of the terminal circuit.

In accordance with specific embodiments of the invention, the coupling network may comprise a low-pass dead-end filter, a high-pass dead-end filter, or a band-pass dead-end filter.

For a better understanding of the invention, together with other and further objects thereof, reference is had to the following description taken in connection with the accompanying drawings, and its scope will be pointed out in the appended claims.

Figure 1B:
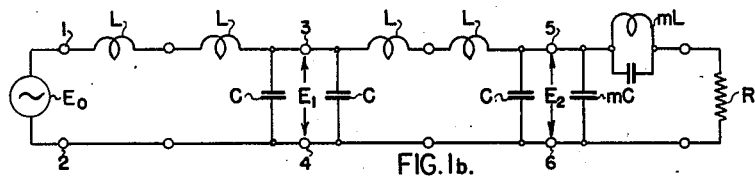
Figure 1C:
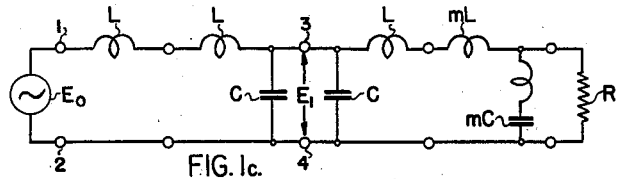
Figure 1D:
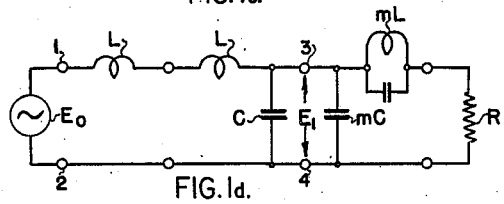
Figure 3A:
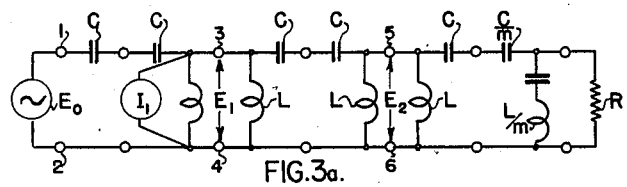
Figure 3B:
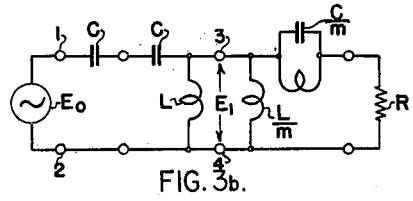
Figure 2:
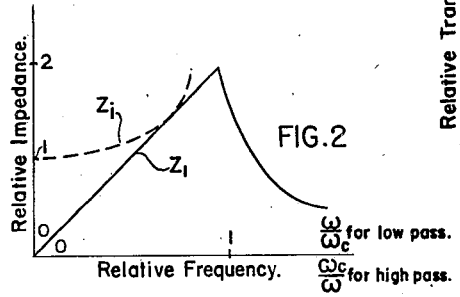
Figure 5:
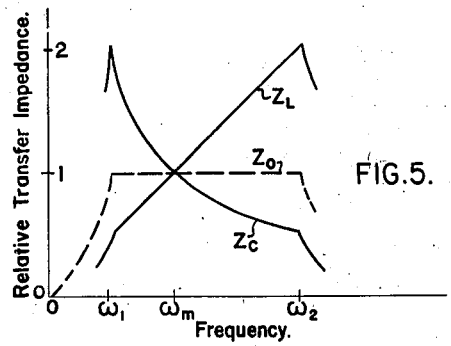
Figure 4A:
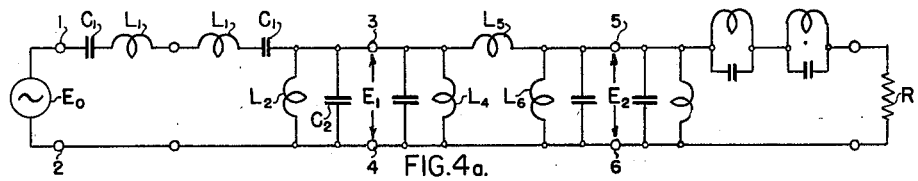
Figure 4B:
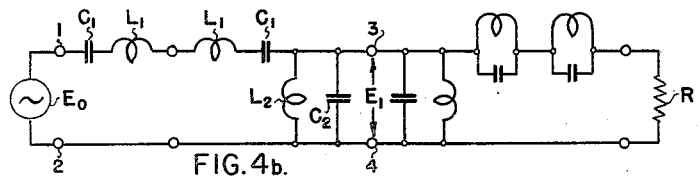
Figure 6:
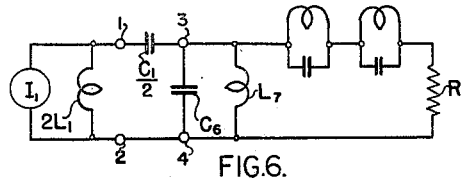
Figure 7:
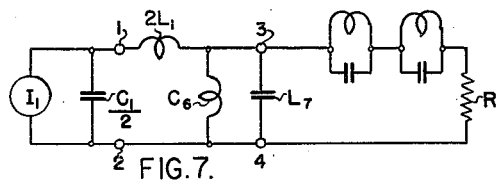
Figure 8A:
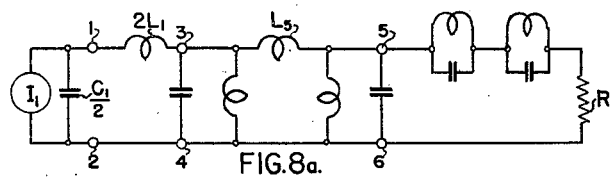
Figure 8B:
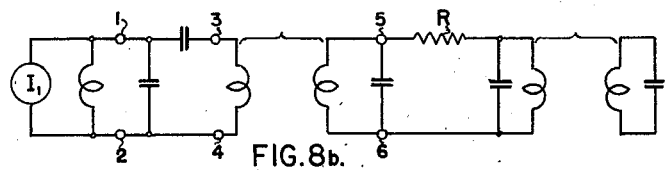
Figure 8C:
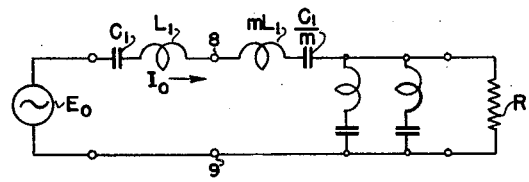

Fig. 1a of the drawings is a circuit diagram illustrating the use of a low-pass dead-end filter of the invention as a two-terminal or four-terminal differentiating network; Figs. 1b, 1c, and 1d are circuits diagrams of modifications of the differentiating network of Fig. 1; Fig. 2 is a graph utilized to explain certain of the operating characteristics of the filters of the invention; Fig. 3a is a circuit diagram of a high-pass dead-end filter of the invention utilized as an integrating network between two terminal circuits; Fig. 3b is a circuit diagram of a modification of the circuit of Fig. 3a; Fig. 4a is a circuit diagram of a band-pass dead-end filter of the invention which may be utilized as a differentiating or integrating network between two terminal circuits; Fig. 4b represents a modification of the circuit of Fig. 4a; Fig. 5 is a graph utilized to explain certain of the operating characteristics of the filters of Figs. 4a and 4b; Fig. 6 is a circuit diagram of a band-pass two-terminal differentiating network in accordance with the invention; Fig. 7 represents a band-pass two-terminal integrating network in accordance with the invention; Fig. 8a is a circuit diagram of a band-pass four-terminal integrating network in accordance with the invention; Fig. 8b represents a modification of the circuit of Fig. 8a; Fig. 8c is a circuit diagram of a band-pass network in accordance with the invention; Fig. 9 is a circuit diagram of a modification of the circuit of Fig. 1d utilized as a coupling network between two vacuum tubes; Fig. 10 is a circuit diagram of a portion of a television transmitter circuit utilizing the invention as a coupling network; Figs. 11 and 12 are graphs utilized to explain the operation of the circuit of Fig. 10; Fig. 13 is a circuit diagram, partly schematic, of a complete television receiver of the superheterodyne type utilizing a modification of the circuit of Fig. 1d as an integrating network in the scanning circuit thereof; Fig. 14 represents a modification of the embodiment of Fig. 8c utilized as an integrating network in the scanning circuit of a television receiver; Fig. 15 is a circuit diagram of a low-pass differentiating network having an arm of full-shunt type connected in the manner of an arm of series type in accordance with the invention; Fig. 16 is a circuit diagram of a high-pass integrating network having an arm of full-shunt type connected in the manner of an arm of series type in accordance with the invention; Fig. 17 is a circuit diagram of a band-pass differentiating network having an arm of full-shunt type including an inductance connected in the manner of an arm of series type in accordance with the invention; while Fig. 18 is a circuit diagram of a band-pass integrating network having an arm of full-shunt type including a capacitance connected in the manner of an arm of series type in accordance with the invention.

The embodiment of the invention represented in Fig. 1a comprises a dead-end confluent filter including an arm of series type and an arm of shunt type adjacent each other and remote from the dead end. The filter also includes several intervening confluent constant-$k$ filter half-sections. Thus, the filter of Fig. 1a comprises four like half-sections, each including a mid-series arm L and a mid-shunt arm C. A dead-end termination is provided for the filter comprising an $m$-derived half-section including a mid-series arm $mL$ and a mid-shunt arm including series-connected inductance and capacitance $mC$ shunted by a terminal resistor R effective to match the image impedance of the $m$-derived half-section at the dead end. An added constant-$k$ mid-series inductance L is connected in series with the terminal mid-series inductance arm at the remote end of the filter in order to provide an inductance arm of full-series value at the pair of terminals 1, 2 in a manner described in detail in United States Letters Patent No. 2,167,134, granted July 25, 1939, on an application of the present applicant and assigned to the same assignee. This method of filter termination is, therefore, a known expedient for securing uniform input admittance over the pass band between zero frequency and the cutoff frequency of the filter.

It follows, therefore, that if the filter is excited by an input voltage $E_0$ at terminals 1, 2 there is a uniform ratio between the input voltage $E_0$ and the mid-shunt junction voltages $E_1$ and $E_2$ across terminals 3, 4 and 5, 6, respectively, over the pass band. The entire filter is a dead-end filter in which the output end is terminated by the dead-end resistor R, the only function of which is to match the $m$-derived termination and thereby to approximate the impedance characteristics of an ideal constant-$k$ filter of an infinite number of sections. If, instead of applying an input voltage $E_0$, the impedance across terminals 1, 2 is considered to be low and there is provided a current generator coupled to terminals 3, 4 for developing a current $I_1$ between terminals 3, 4, an excitation is provided which is equivalent to an input voltage, $$E_0 = 2\ j\omega L\ I_1 \qquad (1)$$

where $\omega$ is the angular frequency. The apparent input voltage at terminals 1, 2 is thus proportional to the frequency of the excitation and the junction voltages $E_1$ and $E_2$ across terminals 3, 4 and 5, 6, respectively, are likewise proportional to the frequency over the pass band. The quotient $E_1/I_1$, which is equal to the impedance at terminals 3, 4, is likewise proportional to the frequency over the pass band and the same is true of the transfer impedance from the pair of terminals 3, 4 to the pair of terminals 5, 6, which is equal to $E_2/I_1$ and is proportional to the frequency within the pass band of the filter.

The impedance $E_1/I_1$ may be derived on the basis of the assumption that the remainder of the filter between terminals 3, 4 and the dead-end termination presents at terminals 3, 4 its image impedance which is:

$$Z_i = \frac{R}{\sqrt{1-\omega^2/\omega_c^2}} \qquad (2)$$

where $\omega_c$ is the angular frequency of cutoff of the filter of Fig. 1a.

The above assumption is valid to the same degree of accuracy as the matching of the terminal resistor R and the image impedance of the filter, so that any degree of approximation can be secured by utilizing single or multiple dead-end terminal $m$-derivations. The resulting impedance of the entire network at the terminals 3, 4 is:

$$Z_1 = \frac{1}{\frac{1}{2j\omega L}+j\omega C+\frac{1}{R}\sqrt{1-\omega^2/\omega_c^2}} \qquad (3)$$

The values of C and L may be expressed in terms of cutoff frequency and terminal resistance as follows:

$$C = 1/R\omega_c;\ L = R/\omega_c \qquad (4)$$

By a combination of the Expression 2 and 4, the impedance becomes:

$$Z_1 = \frac{R}{\frac{\omega_c}{2j\omega}+j\omega/\omega_c+\sqrt{1-\omega^2/\omega_c^2}} \qquad (5)$$

Over the pass band, $\omega$ is less than the cutoff frequency $\omega_c$ and the image impedance is resistive so that the magnitude of the impedance is:

$$Z_1 = \frac{2R\omega/\omega_c}{\sqrt{(1-2\omega^2/\omega_c^2)^2 + (2\omega/\omega_c)^2(1-\omega^2/\omega_c^2)}}$$

$$= 2R\frac{\omega}{\omega_c} = 2L\omega \quad (6)$$

It is apparent from Equation 6 that the impedance between terminals 3, 4 over the pass band is equal in magnitude to the impedance of the full-series inductance arm of the filter between terminals 1 and 3. Outside the pass band, the impedance is reduced by the shunt capacitance of the filter.

The filter of Fig. 1a thus comprises an arm of series type, consisting of inductances L, L, connected between terminals 1, 3 and an arm of shunt type, consisting of capacitances C, C, connected between terminals 3, 4, both of the arms being adjacent each other and remote from the dead end of the filter which is terminated by resistor R. The arm of shunt type, that is, the capacitance between terminals 3, 4, is coupled in the circuit of the filter in the normal manner while the other of the arms, that is, the inductance arm between terminals 1, 3, is of the full-series type but is coupled in the circuit of the filter in the same manner as the normal shunt arm between terminals 3, 4 due to the fact that the internal impedance of $E_0$ is very low and terminals 1, 2 may be considered as being short-circuited.

An essential property of the filter of Fig. 1a is its transfer impedance, which may be utilized as a coupling impedance or interstage network to derive from the anode current of a preceding tube a voltage to be applied to the grid of the succeeding tube. This property of the network is reciprocal as between the terminals 3, 4 and 5, 6 in that either may be used as the input pair of terminals and the other as the output pair of terminals. Also, the terminals 3, 4 may be used as both the input and output pairs of terminals and the filter then becomes a self-impedance, two-terminal coupling network.

The circuit of Fig. 1a has a sufficient number of constant-$k$ half-sections to provide across each of terminals 3, 4 and 5, 6 a total shunt capacitance of 2C which is the maximum that can be tolerated across any junction of a filter of nominal impedance R. This is important in the use of this network as an interstage coupling impedance because the total shunt capacitance across each of the input and output terminals may then comprise the inherent capacitance associated with the terminal circuits, which permits the use of the greatest possible value of R and, therefore, the greatest possible value of coupling impedance.

The filter of Fig. 1b is generally similar to that of the filter of Fig. 1a except that the filter of Fig. 1b comprises only three constant-$k$ half-sections each including a mid-series arm L and a mid-shunt arm C. The $m$-derived terminating half-section of the filter of Fig. 1b comprises a mid-shunt arm including capacitance $mC$ and a mid-series arm including parallel-connected capacitance and inductance $mL$ to which is coupled the terminating resistance R. The value of $m$ is less than one, usually about 0.6. The circuit of Fig. 1b, therefore, tolerates slightly less capacitance $(1+m)C$ across the terminals 5, 6 than does the circuit of Fig. 1a.

The circuits of Figs. 1c and 1d are based on the same general principles described in detail above, but have only a single mid-shunt junction at terminals 3, 4 and are, therefore, ordinarily useful only as two-terminal coupling impedances. The circuit of Fig. 1c has maximum shunt capacitance 2C across the terminals 3, 4 while the circuit of Fig. 1d has slightly less capacitance $(1+m)C$ across the terminals 3, 4. The circuit of Fig. 1c can be derived directly from the circuit of Fig. 1a by the omission of two of the constant-$k$ filter half-sections of Fig. 1a, while the circuit of Fig. 1d can be derived directly from the circuit of Fig. 1b in the same manner.

In Fig. 2 there is shown a graph of the constant-$k$ mid-shunt image impedance $Z_1$ involved in the above expressions plotted against relative frequency and also the resultant impedance $Z_1$ across terminals 3, 4. In the pass band $Z_1$ is equal to the transfer impedance regardless of whether the network is used as a two-terminal or as a four-terminal coupling impedance and varies substantially as the first power of the frequency. The phase characteristic within the pass band and the attenuation characteristic outside the pass band depend on whether the network is used as a two-terminal or as a four-terminal coupling impedance and, in the latter case, on the number of filter half-sections between input and output circuits. If a phase-correcting section is needed in the filter, the filter can be opened at a point between the input and output pairs of terminals and the phase-correcting sections inserted in accordance with the principles of confluent networks well understood in the art.

A high-pass filter is adapted to provide an integrating network in much the same manner that each of the low-pass filters, described above, is adapted to provide a differentiating network. The circuits of the high-pass filters of Figs. 3a and 3b are similar, respectively, to those of Figs. 1a and 1d except for the change from a low-pass to a high-pass filter configuration. In each case, as is specifically illustrated in the filter of Fig. 3a, the network is considered as having a source of current $I_1$ coupled to the terminals 3, 4 in place of the source of voltage $E_0$ between terminals 1 and 2, which are considered to be short-circuited. The impedance across terminals 3, 4 of the filters of Figs. 3a and 3b is inversely proportional to frequency over the high-pass band rather than directly proportional to frequency, as in the case of the low-pass filters described above. Both characteristics are illustrated in the graph of Fig. 2 with the change of abscissae indicated. For the circuit of Figs. 3a and 3b, the magnitude of the impedance over the pass band at the terminals 3, 4 is:

$$|Z_1| = 2R\frac{\omega_c}{\omega} = \frac{2}{C\omega} \quad (7)$$

This is equal in magnitude to the impedance of the capacitive arm between terminals 1 and 3, which is equivalent to a full-series arm of the constant-$k$ high-pass filter and is connected in the circuit of the filter in the same manner as the full-shunt arm between terminals 3, 4. That is, the impedance at terminals 3, 4 is, over the pass band, inversely proportional to frequency so that the filter may be used as an integrating network. In the circuit of Fig. 3a, the limitation on the magnitude of the value of resistance R and, therefore, on the coupling impedance of the filter network, is not the amount of shunt capacitance as in the case of the low-pass filters, described above, but is the inverse amount of shunt inductance. The circuit of Fig. 3b has a slightly greater inductance across the terminals 3, 4 than the circuit of Fig. 3a.

Just as a low-pass dead-end filter circuit is adapted to act as a differentiating network and a high-pass dead-end filter network is adapted to act as an integrating network, so a band-pass filter may be adapted to provide either differentiating or integrating properties with both shunt capacitance and shunt inductance across the terminal circuits of the network.

In Fig. 4a there is illustrated a band-pass filter in accordance with the present invention which is analogous to the low-pass filter network of Fig. 1b except that one of the constant-$k$ filter whole-sections has been modified to the form of a transformer filter section including inductances $L_4$, $L_5$, and $L_6$. The filter comprises a constant-$k$ filter half-section including a mid-series arm consisting of series-connected inductance $L_1$ and capacitance $C_1$ and a mid-shunt arm consisting of parallel-connected inductance $L_2$ and capacitance $C_2$. It also comprises an $m$-derived terminal half-section and impedance-matching resistor R at the dead end.

Another similar band-pass filter circuit in accordance with the invention is illustrated in Fig. 4b which is identical to Fig. 4a except for the omission of the constant-$k$ filter whole-section. The circuit of Fig. 4b is analogous to the low-pass network of Fig. 1d.

Each of the band-pass filters of Figs. 4a and 4b has an added mid-series arm $L_1$, $C_1$ at the input end of the filter, that is, connected in series with the generator $E_0$ between the pairs of terminals 1, 2 and 3, 4, which makes the input admittance $1/Z_0$ between the terminals 1, 2 uniform over the pass band, as explained in detail in applicant's above-mentioned patent. Under these conditions, the voltages $E_1$ and $E_2$ at the mid-shunt junctions 3, 4 and 5, 6 of the filter are equal in magnitude to the input voltage $E_0$ over the pass band.

However, differentiating properties can be obtained in the network of Figs. 4a and 4b by passing the input current $I_1$ through only a portion of the arm between terminals 1 and 3, specifically only through the series-inductance elements in the arm between terminals 1 and 3, which is analogous to the manner in which the input current $I_1$ is connected into the low-pass differentiating circuits described above. In Fig. 1a, for instance, the current generator $I_1$ is effectively connected across the inductance $2L$ in the corresponding arm, the generator being replaced by a short-circuit, as explained above. This, in the case of the filters of Figs. 4a and 4b, is equivalent to an input voltage:

$$E_0 = 2j\omega L_1 I_1 \qquad (8)$$

and equal voltages are obtained at the junctions 3, 4 and 5, 6 over the pass band. The value of the mid-series inductance $L_1$ is:

$$L_1 = \frac{R}{\omega_2 - \omega_1} \qquad (9)$$

in which $\omega_1$ and $\omega_2$ are the lower and upper angular frequencies of cutoff, respectively. The transfer impedance between terminals 3, 4 and 5, 6 of Fig. 4a has the magnitude:

$$|Z_L| = 2R \frac{\omega}{\omega_2 - \omega_1} = 2L_1 \omega \qquad (10)$$

This is illustrated in Fig. 5 relative to its value at the mean frequency of the pass band. In Fig. 5 there are shown a graph $Z_L$ of the transfer impedance from an input current through the two inductances $L_1$ in series and a graph $Z_C$ of the transfer impedance from an input current through the two condensers $C_1$ in series. The dotted curve $Z_0$ is the impedance presented to the input voltage $E_0$, as described above.

In Fig. 6 there is shown an adaptation of the filter circuit of Fig. 4b as a two-terminal differentiating network. The circuit of Fig. 6 may be derived from that of Fig. 4b by combining adjacent elements of like kind into the single elements including shunt inductances $2L_1$ and $L_7$ and the condensers $C_1/2$ and $C_8$. The coupling network of Fig. 6 has shunt inductance across the current generator $I_1$ and across the terminals of the network 3, 4. The filter of Fig. 6 also has both series and parallel capacitance between the generator $I_1$ and terminals 3, 4 which, by a simple impedance transformation, can be modified to provide shunt capacitance across current generator $I_1$.

The adaptation of the circuits of Figs. 4a and 4b as integrating networks involves coupling the input current into the network across only the two series condensers between the terminals 1 and 3, instead of across the inductances as in the case of the differentiating network of Fig. 6. This adaptation of the circuit of Fig. 4b is illustrated in Fig. 7 and the circuit of Fig. 7 may be derived from the circuit of Fig. 4b by combining adjacent elements of like kind in a manner similar to that utilized in the derivation of the circuit of Fig. 6, and the combined elements which are similar to those of Fig. 6 have identical reference symbols.

The effective value of the input voltage of the circuit of Figs. 4a or 4b is:

$$E_0 = \frac{2I_1}{j\omega C_1} \qquad (11)$$

and the value of the series capacitance is:

$$C_1 = \frac{1}{L_1 \omega_m^2} = \frac{\omega_2 - \omega_1}{R \omega_1 \omega_2} \qquad (12)$$

in which the mean frequency of the pass band is:

$$\omega_m = \sqrt{\omega_1 \omega_2} \qquad (13)$$

The transfer impedance $Z_C$ as an integrating network is illustrated in Fig. 5 and its magnitude is:

$$|Z_C| = \frac{2R\omega_1 \omega_2}{\omega(\omega_2 - \omega_1)} = \frac{2}{C_1 \omega} \qquad (14)$$

In Fig. 8a there is illustrated an integrating network derived from the circuit of Fig. 4a by merging adjacent circuit elements of the same kind and similar circuit elements have identical reference symbols. The differentiating circuit of Fig. 8b is electrically equivalent to that of Fig. 8a and is obtained therefrom by impedance transformation and the substitution of mutual inductance for certain of the inductances of the circuit of Fig. 8a.

The circuit of Fig. 8c illustrates the development of a band-pass filter in accordance with the invention utilized as an integrating coupling network and comprising only a single $m$-derived half-section including a mid-series arm consisting of series-connected capacitance $C_1/m$ and inductance $mL_1$ and a single constant-$k$ mid-series arm including inductance $L_1$ and capacitance $C_1$ added in series with the input terminals 8, 9 to provide the full-series termination. In the circuit of Fig. 8c there is no junction similar to that of terminals 3, 4 or 5, 6 of Fig. 4a at which there is a voltage equal in magnitude to the nominal input voltage $E_0$. The input admittance, however, is uniform over the pass band so that the current in the series arm has the magnitude:

$$I_0 = \frac{E_0}{R} \quad (15)$$

If an input current $I_1$ is coupled to the circuit through the effective series capacitance, the effective value of the input voltage is:

$$E_0 = \frac{1+m}{j\omega C_1} I_1 \quad (16)$$

and the magnitude of the current in the series arm is:

$$I_0 = \frac{1+m}{RC_1\omega} I_1 = \frac{(1+m)\omega_1\omega_2}{\omega(\omega_2-\omega_1)} I_1 \quad (17)$$

the latter form being obtained by substituting for $C_1$ its value in Equation 12.

The last relations show that the ratio $I_0/I_1$ is inversely proportional to frequency, which expresses the property of integration.

The circuit of Fig. 9 illustrates the application of the principles outlined above to an intertube coupling circuit. The circuit of Fig. 9 shows the low-pass filter network of Fig. 1d reduced to its minimum number of components and used as a two-terminal differentiating coupling impedance between two vacuum tubes 10, 11. Similar circuit elements have identical reference symbols in the two figures. The shunt capacitance $mC/m+1$ of the circuit of Fig. 9 can be mainly that of the inherent capacitance of the circuit including the interelectrode capacitance of vacuum tubes 10 and 11 coupled to the circuit. In the interest of simplification, the circuits for supplying direct operating potentials to the tubes of the circuit of Fig. 1 have been omitted.

An application of a differentiating network embodying the invention is illustrated in the circuit of Fig. 10 in which the differentiating network is used as a coupling network in an amplifier circuit of a television transmitter. In coupling the output of a camera tube to the grid circuit of the first amplifier tube in a television transmitter, maximum coupling impedance is required at all frequencies in the pass band. Even though the impedance cannot be maintained uniform at such a high value, this maximum coupling impedance is desirable in order to prevent the sacrifice of gain in any portion of the frequency band. The impedance of such a coupling circuit is limited at the higher frequencies by the total shunt capacitance including the output capacitance of the camera tube and the input capacitance of the first vacuum-tube amplifier so that a much greater impedance can be secured at the lower frequencies than at the higher frequencies. In other words, this coupling circuit has the properties of an integrating network, and a differentiating network in accordance with the invention can be utilized to provide compensation.

The transmitter circuit of Fig. 10 comprises a coupling network between a camera tube 12 and a first vacuum-tube amplifier 13 which includes a series arm including inductance $L_b$ having shunt conductance $G_b$, and shunt capacitance arms $C_a/2$, $C_a/2$, which may comprise the inherent and interelectrode capacitances of the circuit. A shunt arm including conductance $G_a$ is also coupled between the midpoint of inductance $L_b$ and the opposite side of the coupling circuit. In order to compensate for the frequency characteristic of the coupling network between the camera tube 12 and amplifier tube 13, there is provided a network in accordance with the teachings of the present invention which is utilized for coupling the output circuit of tube 13 to the input circuit of a succeeding amplifier tube 14. The output circuit of tube 14 is connected to the television transmitter 15 which, it will be understood, comprises conventional circuits for modulating the video-frequency output of tube 14 on a carrier wave for transmission.

In considering the coupling impedance of the network between camera tube 12 and amplifier 13, it will be seen that the impedance at the higher frequencies is limited by the total shunt capacitance $C_a$. By using a small shunt conductance $G_a$, the impedance at the low frequencies is made very large. This shunt conductance $G_a$ also determines the grid bias of the amplifier tube and carries the small anode current required for the camera tube. The circuits for supplying unidirectional operating potentials to the tubes of Fig. 10 have been omitted in the interest of simplification. The inductance $L_b$ resonates with the input capacitance of $C_a/2$ at the nominal cut-off frequency $\omega_c$. The resonant peak at this frequency is flattened by the conductance $G_b$. The effect of $G_a$ on the low-frequency impedance and the effect of $G_b$ on the high-frequency impedance of the coupling circuit are nearly independent. The following relations obtain in this circuit:

$$L_b = \frac{4}{C_a \omega_c^2}; \quad G_b = \frac{1}{2L_b\omega_c} = \frac{C_a\omega_c}{8}; \quad G_a \ll C_a\omega_c \quad (18)$$

A graph illustrating the transfer impedance of the coupling network described is shown in Fig. 11. Curve $Z_a$ shows the coupling impedance of $C_a$ alone while the curve $Z_b$ shows the coupling impedance of the network. These are both nearly inversely proportional to frequency in the pass band so that the coupling network between the camera tube 12 and the amplifier 13 has some of the properties of an integrating network. If the input circuit of tube 13 included only the shunt capacitance $C_a$, it would be a pure integrating network and could be compensated exactly over the pass band by the differentiating network of Fig. 9 utilized as a coupling network between tubes 13 and 14. The actual characteristic curve $Z_b$ requires a modification of the differentiating network of Fig. 9 for compensation.

The interstage coupling network utilized for coupling the output circuit of vacuum tube 13 to the input circuit of tube 14 is a four-terminal coupling impedance similar to that of Fig. 1b but differing therefrom only by the combination of adjacent reactance elements of like kind and by the inclusion of a resistor $R'$ in order to compensate for the particular characteristic of the camera-tube coupling impedance network. The best compensation is obtained with the values of circuit elements modified from those of Fig. 1b in accordance with the following relations:

$$n = 1.16; \quad n' = 2.98; \quad R' = n'L\frac{G_a}{C_a} \ll L\omega_c \quad (19)$$

These relations are independent of the values of $G_b$ but the value of $G_b$ as given in Equation 18 provides an input coupling impedance, the variation of which is nearly exactly compensated by that of the interstage differentiating network between tubes 13 and 14. Circuit elements which are similar to those of Fig. 1b have identical reference symbols. This network has a relative impedance variation over the pass band, as illustrated in Fig. 12 by curve Z'. This is very nearly the reciprocal of the curve $Z_b$ of Fig. 11 over the pass band.

In Fig. 13 there is illustrated a coupling network in accordance with the invention utilized in the scanning circuit of a television receiver. The system there illustrated comprises a receiver of the superheterodyne type including an antenna and ground system 20, 21 connected to a radio-frequency amplifier 22 to which are connected in cascade, in the order named, an oscillator-modulator 23, an intermediate-frequency amplifier 24, a detector 25, a video-frequency amplifier 26, and a cathode-ray image-reproducing device 27 which may be a cathode-ray tube as indicated schematically. A field-frequency scanning generator embodying the invention is coupled between a synchronizing-pulse processor 25' and the deflecting plates 31a, 31b of device 27 for deflecting the cathode-ray beam in one direction, while a line-frequency scanning generator 30', which may be in accordance with the teachings of the present invention or in accordance with an arrangement known in the art, is provided for deflecting the cathode-ray beam in another direction normal to the first direction.

The elements 20–27, inclusive, may all be of conventional well-known construction so that a detailed explanation of their operation is unnecessary. Referring briefly, however, to the operation of the system of Fig. 13 as a whole and neglecting for the moment the operation of the portion thereof embodying the present invention presently to be described, television signals intercepted by the antenna circuit 20, 21 are selected and amplified in radio-frequency amplifier 22 and supplied to the oscillator-modulator 23 wherein they are converted to intermediate-frequency signals which, in turn, are selectively amplified in the intermediate frequency amplifier 24 and delivered to the detector 25. The modulation components of the signal are derived by the detector 25 and are supplied to the video-frequency amplifier 26 wherein they are amplified and from which they are supplied in the usual manner to a brightness-control electrode of the image-reproducing device 27. The intensity of the scanning beam of the image-reproducing device 27 is modulated or controlled in accordance with the video-frequency voltage impressed on its control electrode in the usual manner. Periodic pulses from synchronizing-pulse processor 25' are used to develop saw-tooth field-frequency scanning voltages across deflecting electrodes 31a, 31b in a manner hereinafter fully described. Suitable line-frequency scanning signals are also provided by scanning generator 30' for deflecting the cathode-ray beam in another direction. Saw-tooth current or voltage waves are thus generated in the scanning circuits to produce electric fields to deflect the ray in two directions normal to each other so as to trace a rectilinear scanning pattern on the screen of the tube and thereby to reconstruct the transmitted picture.

Coming now to the portion of the circuit of Fig. 13 involving the present invention, a band-pass integrating network in accordance with the invention is utilized to develop a saw-tooth voltage for the deflecting plates 31a, 31b of the image-reproducing device 27 from a current of pulse wave form, which may be obtained from an oscillator or synchronizing-signal processor 25' synchronized by a signal derived from detector 25. The coupling network itself is similar to that of Fig. 9 in its configuration but the circuit values are differently proportioned. The coupling network comprises shunt capacitance 33 which may be comprised in whole or part of the inherent capacitance of the circuit and the deflecting plates 31a, 31b and the interelectrode capacitance of a coupling tube 30. In parallel with capacitance 33 is an inductance 34 and a circuit including a resistor 35 in series with a parallel-tuned circuit 36, 37, all coupled across the output electrodes of vacuum tube 30. Circuits for supplying unidirectional operating potentials to the tube 30 have been omitted in the interest of simplification.

The coupling circuit of Fig. 13 is proportioned in accordance with the principles outlined above with reference to Fig. 3b so that it constitutes a high-pass filter adapted for integration instead of a low-pass filter adapted for differentiation, as is the circuit of Fig. 9. It will be understood that vacuum tube 30 is supplied with a voltage of pulse wave form and delivers to the integrating network a current of pulse wave form which, in turn, is integrated to develop a saw-tooth voltage which is applied to deflecting plates 31a, 31b. By virtue of the design of the integrating filter network in accordance with the principles discussed above, the response of the network varies linearly with frequency over a frequency band sufficiently wide to include the essential harmonics of the field-scanning frequency to develop a substantially ideal saw-tooth voltage wave having a substantially linear trace portion, which is required for accurate scanning.

In summary, therefore, it is seen that the television receiver of Fig. 13 includes a signal-reproducing device comprising an electrostatic scanning arrangement including deflecting means 31a, 31b adapted to be supplied with a scanning voltage in response to a synchronizing signal derived from detector 25. A differentiating coupling network is included in the circuit for providing, in response to the synchronizing signal, a scanning voltage for the deflecting means. This coupling network comprises a shunt arm including parallel-connected capacitance 33, inductance 34, and a series-connected resistance 35 and parallel-resonant circuit 36, 37, the parameters of the network being proportioned to provide a differentiating coupling network.

A circuit utilizing the filter of Fig. 8c is represented in Fig. 14. The circuit of Fig. 14 is an integrating coupling circuit for supplying a scanning current of saw-tooth wave form to a cathode-ray television tube. Similar circuit elements have identical reference symbols in the two figures. It will be understood that the remainder of the receiver circuit of Fig. 14 may be in accordance with that illustrated in Fig. 13 and that the vacuum tube 31 is effective to derive a voltage of pulse wave form from the detector of the receiver to provide a current of pulse wave form in the output circuit of vacuum tube 31. The deflecting coils of the embodiment of the invention of Fig. 14 comprise the inductances $L_1$ and $mL_1$ of the filter circuit of Fig. 8c. This arrangement secures the desired saw-tooth current in the deflecting coils by integration of a current of pulse wave form obtained from vacuum tube 31 and has the desirable linear properties discussed above in connection with the line-scanning generator of Fig. 13.

In summary, therefore, it is seen that the integrating coupling network of Fig. 14 is adapted to be included in a television receiver having a signal-reproducing device comprising a magnetic scanning arrangement and including a scanning coil adapted to be supplied with a scanning current in response to a synchronizing signal. The integrating coupling network includes a shunt arm effectively including capacitance $C_1/1+m$) a series arm including the scanning coils, and a shunt arm including two series-resonant circuits and a resistor R, all connected in parallel, the parameters of the coupling network being proportioned so that the coupling network acts as an integrating network.

In Fig. 15 is shown a differentiating network comprising an $m$-derived low-pass filter half-section terminated by a resistance R which is its proper terminating impedance, the $m$-derived half-section being preceded by a constant-$k$ filter section. The filter of Fig. 15 differs from Fig. 1c in that it comprises an arm of full-shunt type connected in the manner of an arm of series type. In filters of this type, the full-shunt arm is fed by a voltage generator of low impedance, that is, a voltage-regulated generator whose output voltage is independent of its load impedance. This voltage-regulated generator is connected in series with a reactance element of an arm of shunt type. Thus, in Fig. 15 there is provided a voltage generator $E_1$ connected in series with the shunt arm comprising capacitance C, C, and the filter is effectively a differentiating coupling network.

In Fig. 16 is shown an integrating network which is derived from a high-pass filter in a manner generally similar to that by which the coupling network of Fig. 15 is derived from the low-pass filter. The filter of Fig. 16 comprises a filter half-section including arms L and C together with an $m$-derived impedance termination including series arm $C/m$ and a shunt arm including series-connected capacitance and inductance $L/m$, together with a suitable terminating resistor R.

Figs. 17 and 18 are, respectively, a band-pass differentiating and a band-pass integrating coupling network and are similar to the circuits of Figs. 4a and 4b performing their same functions, but differ in that reactance of an arm of full-shunt type is connected in the manner of an arm of the series type in these networks. Thus, the filter of Fig. 17 comprises a full-filter section including an arm of shunt type including inductance L and capacitance C, the capacitance element C being connected in series with generator $E_1$ so that it is effectively coupled in the filter as a series element. Similarly, the inductance element L of the filter of Fig. 18 is effectively connected in the filter as a series element.

It will be understood that the invention is not limited to the specific applications illustrated for the purpose of explaining the invention. The differentiating circuits of the invention are of general application and may, for instance, be utilized as frequency discriminators to convert a frequency-modulated signal to an amplitude-modulated signal in a modulated-carrrier signal receiver for receiver frequency-modulated carrier waves.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A coupling network comprising, a dead-end filter including an arm of series type and an arm of shunt type adjacent each other and remote from said dead end, one of said arms being coupled in the circuit of said filter in the manner which is normal for arms of its type and the other of said arms being an arm of a full-filter section and comprising a reactive element coupled in the circuit of said filter in the same manner as said one of said arms, and input and output circuits so coupled with said filter that the transfer characteristic of said filter between said circuits varies substantially as the first power of the frequency over the pass band of said filter.

2. A coupling network comprising, a dead-end filter including an arm of full-series type and an arm of full-shunt type adjacent each other and remote from said dead end, one of said arms being coupled in the circuit of said filter in the manner which is normal for arms of its type and the other of said arms comprising a reactive element coupled in the circuit of said filter in the same manner as said one of said arms, and input and output circuits so coupled with said filter that a transfer characteristic of said filter between said circuits varies substantially as the first power of the frequency over the pass band of said filter.

3. A coupling network comprising, a dead-end filter including an arm of series type and an arm of shunt type adjacent each other and remote from said dead end, one of said arms being coupled in the circuit of said filter in the manner which is normal for arms of its type and the other of said arms being of a full-filter section type and comprising a reactive element coupled in the circuit of said filter in the same manner as said one of said arms, and input and output circuits for said filter, one of said circuits being coupled directly across at least a portion of said other of said arms and the other of said circuits being so coupled with said filter that a transfer characteristic of said filter between said circuits varies substantially as the first power of the frequency over the pass band of said filter.

4. A coupling network comprising, a dead-end filter including an arm of constant-$k$ series type and an arm of constant-$k$ shunt type adjacent each other and remote from said dead end, one of said arms being coupled in the circuit of said filter in the manner which is normal for arms of its type and the other of said arms being of a constant-$k$ full-filter type and comprising a reactive element coupled in the circuit of said filter in the same manner as said one of said arms, and input and output circuits so coupled with said filter that a transfer characteristic of said filter between said circuits varies substantially as the first power of the frequency over the pass band of said filter.

5. A coupling network comprising, a dead-end filter including an $m$-derived half-section at one end thereof, a terminating resistor coupled to and matching the image impedance of said $m$-derived filter section at said dead end, an arm of series type and an arm of shunt type adjacent each other and remote from said dead end, one of said arms being coupled in the circuit of said filter in the manner which is normal for arms of its type and the other of said arms being of the type of a full-filter section and comprising a reactive element coupled in the circuit of said filter in the same manner as said one of said arms, and input and output circuits so coupled with said filter that a transfer characteristic of said filter between said circuits varies substantially as the first power of the frequency over the pass band of said filter.

6. A differentiating coupling network comprising, a dead-end filter having an arm of full-series type including an inductance and an arm of full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled with said filter, one of said circuits being coupled across said inductance and the other of said circuits being coupled across a mid-shunt junction of said filter, whereby the transfer impedance of said filter between said circuits varies directly as the first power of the frequency over the pass band of said filter.

7. A differentiating coupling network comprising, a dead-end filter having an arm of constant-$k$ full series type including an inductance and an arm of constant-$k$ full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled with said filter, one of said circuits being coupled across said inductance and the other of said circuits being coupled across a constant-$k$ mid-shunt junction of said filter, whereby the transfer impedance of said filter between said circuits varies directly as the first power of the frequency over the pass band of said filter.

8. An integrating network comprising, a dead-end filter having an arm of full-series type including series capacitance and an arm of full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled to said filter, one of said circuits being coupled across said capacitance and the other of said circuits being coupled across a mid-shunt junction of said filter, whereby the transfer impedance of said filter between said circuits varies inversely as the first power of the frequency over the pass band of said filter.

9. An integrating network comprising, a dead-end filter having an arm of constant-$k$ full-series type including series capacitance and an arm of constant-$k$ full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled to said filter, one of said circuits being coupled across said capacitance and the other of said circuits being coupled across a constant-$k$ mid-shunt junction of said filter, whereby the transfer impedance of said filter between said circuits varies inversely as the first power of the frequency over the pass band of said filter.

10. A differentiating network comprising, a low-pass dead-end filter having an arm of full-series type including inductance and an arm of full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled with said filter, one of said circuits being coupled across said inductance and the other of said circuits being coupled across a mid-shunt junction of said filter, whereby the transfer impedance between said circuits varies directly as the first power of the frequency over the pass band of said filter.

11. An integrating network comprising, a high-pass dead-end filter having an arm of full-series type including series capacitance and an arm of full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled with said filter, one of said circuits being coupled across said capacitance and the other of said circuits being coupled across a mid-shunt junction of said filter, whereby the transfer impedance of said filter between said circuits varies inversely as the first power of the frequency over the pass band of said filter.

12. A coupling network comprising, a band-pass dead-end filter having an arm of full-series type including series-connected capacitance and inductance elements and an arm of full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled with said filter, one of said circuits being coupled across one of said elements and the other of said circuits being coupled across a mid-shunt junction of said filter, whereby a transfer characteristic of said filter between said circuits varies substantially as the first power of the frequency over the pass band of said filter.

13. A differentiating network comprising, a band-pass dead-end filter having an arm of full-series type including series-connected inductance and capacitance and an arm of full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled with said filter, one of said circuits being coupled across said inductance and the other of said circuits being coupled across a mid-shunt junction of said filter, whereby the transfer impedance of said filter between said circuits varies directly as the first power of the frequency over the pass band of said filter.

14. An integrating network comprising, a band-pass dead-end filter having an arm of full-series type including series-connected inductance and capacitance and an arm of full-shunt type adjacent each other and remote from said dead end, one of said arms being coupled in the circuit of said filter in the manner which is normal for arms of its type and the other of said arms being coupled in the circuit of said filter in the same manner as said one of said arms, and input and output circuits coupled to said filter, one of said circuits being coupled across said capacitance and the other of said circuits being coupled across a mid-shunt junction of said filter, whereby the transfer impedance of said filter between said circuits varies inversely as the first power of the frequency over the pass band of said filter.

15. In a television receiver including a signal-reproducing device comprising a magnetic scanning arrangement including a scanning coil adapted to be supplied with a scanning current in response to a synchronizing signal, an integrating coupling network for providing in response to said synchronizing signal a scanning current in said coil comprising, a shunt arm effectively including capacitance, a series arm including said scanning coil, and a shunt arm including two series-resonant circuits and a resistor all connected in parallel, the parameters of said coupling network being proportioned so that said coupling network is an integrating network.

16. In a television receiver including a signal-reproducing device comprising an electrostatic scanning arrangement including deflecting means adapted to be supplied with a scanning voltage in response to a synchronizing signal, a differentiating coupling network for providing in response to said synchronizing signal a scanning voltage to said deflecting means comprising, a shunt arm including parallel-connected capacitance, inductance, and series-connected resistance and parallel-resonant circuit, the parameters of said coupling network being proportioned to provide a differentiating coupling network.

17. A differentiating coupling network comprising, a shunt arm including parallel-connected capacitance and a circuit including series-connected inductance and resistance, a series arm including inductance, and a shunt arm including capacitance in parallel with a circuit including series-connected resistance and a parallel-resonant circuit, the parameters of said network being proportioned to provide a differentiating network in accordance with Equations 4, 5, 6, and 19 of the attached specification.

HAROLD A. WHEELER.